(12) United States Patent
Arntz et al.

(10) Patent No.: US 6,686,823 B2
(45) Date of Patent: Feb. 3, 2004

(54) INDUCTIVE POWER TRANSMISSION AND DISTRIBUTION APPARATUS USING A COAXIAL TRANSFORMER

(75) Inventors: Floyd D. Arntz, Newton, MA (US); Ian S. Roth, Bedford, MA (US); Marcel P. J. Gaudreau, Lexington, MA (US); Brian J. Doherty, Weston, MA (US)

(73) Assignee: PRI Automation, Inc., Billerica, MA (US)

( * ) Notice: Subject to any disclaimer, the term of this patent is extended or adjusted under 35 U.S.C. 154(b) by 0 days.

(21) Appl. No.: 10/134,804

(22) Filed: Apr. 29, 2002

(65) Prior Publication Data

US 2003/0201862 A1 Oct. 30, 2003

(51) Int. Cl.⁷ .............................................. H01F 38/20
(52) U.S. Cl. ........................ 336/174; 336/173; 336/175; 336/229; 336/92
(58) Field of Search ................................ 336/173, 174, 336/175, 229, 92; 29/602.1

(56) References Cited

U.S. PATENT DOCUMENTS 3,665,356 A * 5/1972 Douglas et al. ............... 336/73
6,163,243 A * 12/2000 Titus ............................ 336/174
6,191,673 B1 * 2/2001 Ogura et al. ................ 336/84 R

* cited by examiner

Primary Examiner—Lincoln Donovan
Assistant Examiner—Jennifer A Poker
(74) Attorney, Agent, or Firm—Weingarten, Schurgin, Gagnebin & Lebovici LLP

(57) ABSTRACT

A coaxial inductive power transfer and distribution apparatus includes a stationary primary conductor and a mobile secondary coil magnetically coupled together to provide for inductive power transfer therebetween. A return conductor that is stationary is mechanically coupled to the primary conductor and ensures the position stability of the primary conductor with respect to the moveable secondary coil. The return conductor also includes an air gap in which a support member for the mobile secondary coil is disposed within. The mobile secondary winding includes a high permeability toroidal core that is coaxially disposed about, and spaced apart from, the primary conductor. A multi-turn coil is radially disposed about the high permeability toroidal core. The support member for the mobile secondary winding extends through the air gap in the return conductor to the exterior of the return conductor, where it may be coupled to an electric vehicle.

11 Claims, 3 Drawing Sheets

INDUCTIVE POWER TRANSMISSION AND DISTRIBUTION APPARATUS USING A COAXIAL TRANSFORMER

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

This invention relates to the transfer of electrical power via induction and in particular to an inductive power transfer and distribution system using a coaxial transformer for electric vehicles.

Electrically powered vehicles are useful in manufacturing and warehouse environments for transporting materials in automated material handling systems. Electrically powered vehicles are desirable in these environments due to their clean operation and low noise. In particular, electrically powered vehicles in a material handling system are particularly useful in semiconductor manufacturing facilities. These systems are able to transport semiconductor material to be processed throughout the facility in a coordinated manner to increase the efficiency of the manufacturing process. Material handling systems often have a fixed dual-rail or monorail system on which an electric vehicle travels to and from assigned destinations. This allows for the precise control of the movement of material along a predetermined path within the facility.

Electric vehicles, however, require sufficient electrical power to have any meaningful mobility and speed. On-board rechargeable energy storage systems, such as batteries, have a significant mass that must be moved in addition to the mass of the material to be transported and the mass of the electric vehicle itself. The mass of the batteries decreases the range and speed of the electric vehicle and as such reduces the time between battery rechargings. Typically, the time between battery rechargings depends upon the mass of the material to be moved and the frequency of use. Accordingly, some form of electrical coupling to a power source or power distribution system is required to recharge these systems without requiring the electric vehicles to be taken out of service. Physical contact between a moving electric vehicle and a power distribution system is often unreliable and has other problems associated with it as well. Brush contact and pantograph are typical prior art methods of coupling a moving electric vehicle to a power distribution system. These prior art methods, however, create a risk of sparking in potentially volatile atmospheres, introducing dirt and grease into an otherwise clean environment, or increasing the risk of a mechanical failure that may disable all or part of the material handling system.

Non-contact forms of power transfer are often used in electric vehicle transportation and material handling systems to provide the primary power to the electric vehicle or to recharge one or more on-board rechargeable power sources. Typically, prior art systems use a form of inductive power transfer to provide power to the electric vehicle in a non-contact manner. These systems typically are configured as a primary coil and a secondary coil in a primary-void-secondary configuration. The secondary coil, which is attached to the electric vehicle, is typically placed on the center post of an E-shaped structure. The primary coil is typically formed by one or more pair of parallel wires that form first and second sides thereof. The current flow in the first and second sides of the primary coil is in opposite directions to generate a magnetic field that is coaxial with the longitudinal axis of the coil. During operation, the center post of the E-shaped structure, on which the secondary coil is disposed, passes between the pair of parallel wires that form the first and second sides of the primary coil. An alternating current is imposed upon the primary coil generating a varying magnetic field that is coupled to the secondary coil, inducing a voltage therein.

This primary-void-secondary configuration, however, allows leakage of the magnetic field and radiates electromagnetic interference (EMI). Leakage of the magnetic field can cause heating of adjacent ferromagnetic structures that can change the physical, electrical, or magnetic properties thereof. EMI can interfere with circuits and data transmission resulting in the loss of time and efficiency. In addition, the use of a long primary of parallel wires results in a very high inductance. In order to achieve useful power levels high voltages must be used. The use of high voltages, often in the hundred of volts range, increases the risk of accidents and increases the cost of the system due to the components needed to manage the higher voltages.

Therefore, it would be advantageous to have an inductive power transfer system that contained the magnetic field and reduced EMI and required lower voltages for operation.

BRIEF SUMMARY OF THE INVENTION

A coaxial inductive power transfer and distribution apparatus is disclosed that includes a primary conductor that is stationary and a mobile secondary coil magnetically coupled to the stationary primary conductor to provide an inductive power transfer therebetween. The primary and secondary coils are disposed within a return conductor that is stationary and acts as a return path for current flowing in the primary center conductor. The primary conductor is mechanically connected to the interior surface of the return conductor to ensure the position stability of the primary conductor with respect to the secondary coil. The return conductor also includes an air gap in which a support member for the mobile secondary coil and structure is disposed within. The mobile secondary coil and structure includes a toroidal core composed of a high permeability material that is coaxially disposed about, and spaced apart from, the primary conductor. A multi-turn coil is radially disposed about the high permeability toroidal core such that magnetic flux produced by a current flowing in the center conductor is coupled to the coil. The secondary structure includes a support element coaxially disposed about the high permeability toroidal core and the multi-turn coil. The support member extends through the air gap in the return conductor to the exterior of the return conductor, where it may be coupled to an electric vehicle. The low inductance of the primary conductor allows for low voltages to be used to power the vehicle electrically coupled to the mobile secondary coil and mechanically coupled to the mobile secondary structure.

A power distribution system is also disclosed that includes a voltage source providing a switched voltage signal having a predetermined frequency and amplitude to a primary coil of a power transformer. The secondary voltage of the power transformer is provided to a resonant circuit that includes a capacitor in parallel with a plurality of transformer primary windings that are connected in series with one another. Each of the plurality of transformer primary windings is magnetically coupled to a corresponding secondary winding. The turns ratio of the primary to secondary windings is such that a predetermined voltage and current are provided in each of the plurality of transformer secondary windings. Each of the plurality of transformer secondary windings is connected to a corresponding center conductor for coupling to a secondary coil to provide power thereto.

Other forms, features and aspects of the above-described methods and system are described in the detailed description that follows.

BRIEF DESCRIPTION OF THE SEVERAL VIEWS OF THE DRAWING

The invention will be more fully understood by reference to the following Detailed Description of the Invention in conjunction with the Drawings of which.

DETAILED DESCRIPTION OF THE INVENTION

Figure 1:
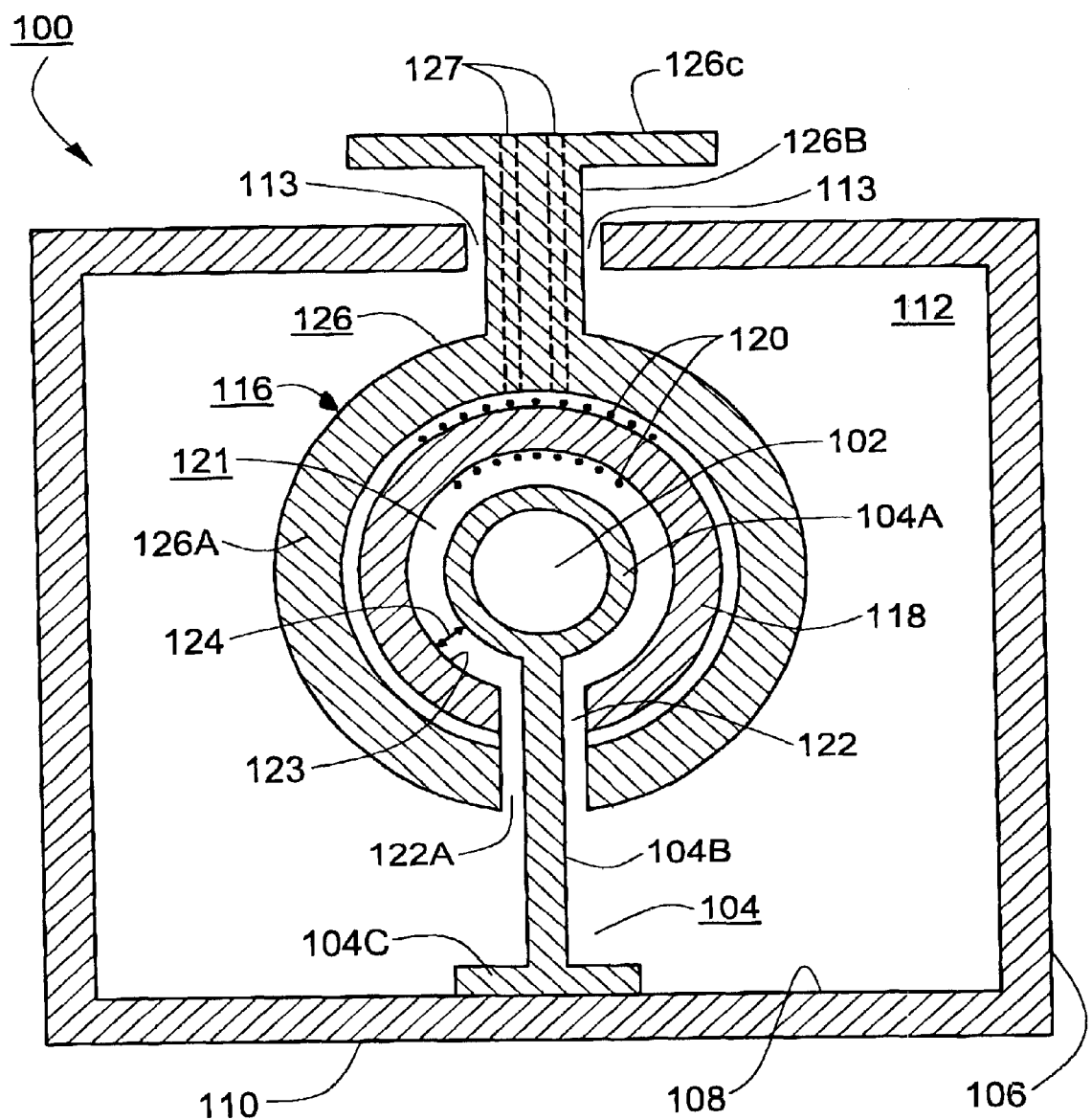
FIG. 1 is a cross-sectional view of a coaxial transformer suitable for use in the presently described invention.
Figure 3:
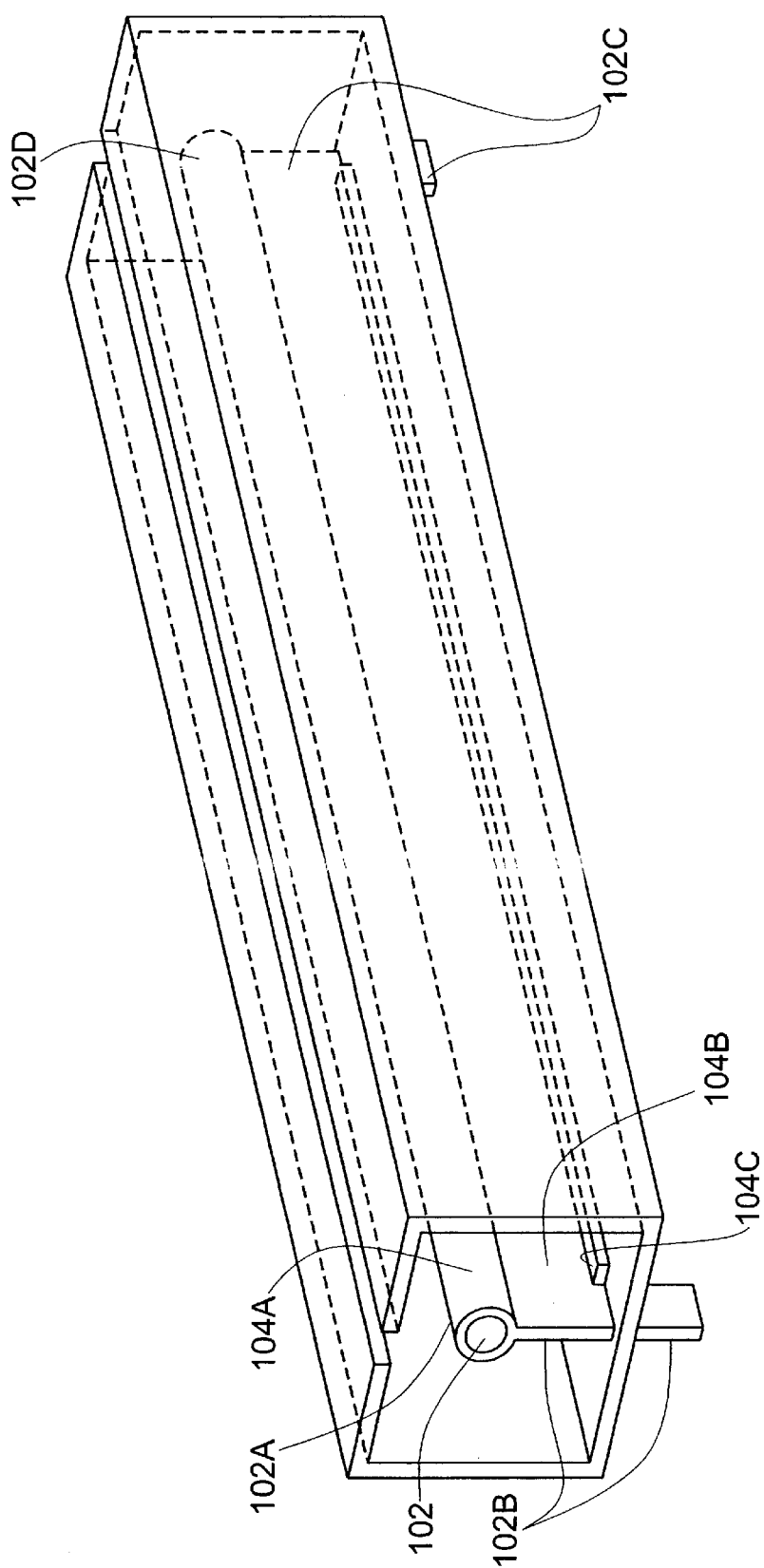
FIG. 3 is a plan view of a coaxial transformer power transfer system.

FIGS. 1 and 3 depict one embodiment of a coaxial transformer 100. The coaxial transformer 100 includes a primary conductor 102 that is coupled to a varying voltage or current source 202. Preferably the primary conductor 102 is a Litz wire that is stationary and extends in the longitudinal direction for a predetermined distance. The primary conductor 102 is coaxially surrounded and supported by a primary conductor support element 104. The primary conductor support element 104 includes a first end 104A that coaxially surrounds and abuts the primary conductor 102, a connecting section 104B that is connected to the first end 104A and further connected to a second end 104C. The second end 104C may be flanged and mechanically connected to a return conductor 106. Preferably, the first end 104A, the connecting section 104B, and the second end 104C are a single unitary piece of rigid insulating material to provide an electrically insulating mechanical connection between the primary conductor 102 and the return conductor 106.

A return conductor 106 forms an enclosure coaxially surrounding the primary conductor 102 and provides a return path of the current in the primary conductor 102. The return conductor 106 includes an inner surface 108, and outer surface 110, an interior volume 112, and an air gap 113. As discussed above, the second end 104C of the center conductor support element 104 is mechanically attached to the inner surface 108 of the return conductor 106 to provide a stable support for the primary conductor 102 to prevent movement of the primary conductor 102. The return conductor is preferably composed of a rigid conducting material that is able to structurally support the center conductor 102.

The primary conductor 102 extends longitudinally a predetermined distance and is electrically connected to the voltage or current source 202 at a first end via a first electrical connection 102B that extends through, but is electrically isolated from, the return conductor 106. The first electrical connection 102B is coupled to the primary conductor via electrical conductor 102A that coaxially surrounds the primary conductor 102. The primary conductor 102 is coupled to the return conductor 106 at a second end via return lead 102C that is electrically connected to the return conductor 106. The primary conductor 102 is electrically coupled to the return lead 102C via electrical conductor 102D that coaxially surrounds the primary conductor 102. In one embodiment, the electrical connection 102B and the return lead 102C are constructed of a section of conductor having a small cross sectional area but a large overall surface area.

A moveable secondary coil 116 is disposed coaxially about the center conductor and the center conductor support 104 and in the event an alternating current is imposed on the primary center conductor, a voltage is induced in the secondary 116. The secondary 116 includes a toroidal core 118 that is constructed of a high magnetic permeability material and includes an air gap 122. The toroidal core 118 has a center orifice 121 having an inner surface 123 and is coaxially disposed about the center conductor support element 104. The center orifice 121 is sized and dimensioned to provide a spaced apart relationship between the inner surface 123 and the center conductor support element 104, forming air gap 124. The moveable secondary 116 further includes at least one multi-turn coil 120 radially wound about the toroidal core 118. Each multi-turn coil 120 is formed from a single conductor and is wrapped about the surface of the toroidal core 118. As will be discussed in more detail below, the plurality of coils are preferably wound about the toroidal core 120 opposite the air gap 124.

The toroidal core 118 is supported by support member 126. Support member 126 includes a support element 126A that is coaxially disposed about the toroidal core 118 and the plurality of radially wound coil 120 and is configured and arranged to provide structural support thereto. The support element 126A also includes an air gap 122A that is aligned with the air gap 122 of the toroidal core 118. The connecting element 104B extends through the air gaps 122 and 122A. Support member 126 includes a connecting member 126B that connects the support element 126A to a flanged end 126C. The connecting member 126B extends beyond the exterior surface of the second conductor 106 and is connected to a flanged end 126C that is exterior to the second conductor. An electric vehicle (not shown) is mounted on the flanged end 126C by known methods. In one embodiment, the support member 126 includes a pair of internal channels 127 extending from the support element 126A through the connecting member 126B and through the flanged end 126C. The ends of the single conductor used to form the multi-turn coil 120 are routed through these two internal channels 127 for coupling to the power supply circuitry,(not shown) of thee electric vehicle (not shown). Preferably, the support member 126 is composed) of aluminum and support element 126A, connecting member 126B, and flanged end 126C are formed from a single unitary piece of material.

In operation, current flowing in the primary center conductor 102 forms a concentric magnetic field that intersects the moveable secondary 116. The primary center conductor 102, the air gap 122, and the toroidal core 118 form a low reluctance magnetic circuit in which the majority of the magnetic flux generated by the primary will flow. The direction of the magnetic field depends upon the direction of the current and the magnitude of the magnetic field is proportional to the magnitude of the current. A magnetic flux path is formed in the toroidal core 118 in a clock-wise or counter clock-wise direction depending on the direction of the current in the primary center conductor 102. The changing direction and magnitude of the magnetic flux generated by the primary center conductor 102 induces a voltage and current in the multi-turn coil 120. This voltage and current are then available and may be used to power an electric vehicle mechanically coupled to the moveable secondary 116 via flange 126C, recharge a rechargeable power source on board such an electrical vehicle, or both. The power that is coupled to the electric vehicle may be used for purposes other than locomotion thereof. Material transport vehicles may contain other functional components that also require electrical power.

The entire secondary 116 is spaced apart from the center conductor 102 and the associated support structure 104 is moveable along the center conductor in the longitudinal direction. Typically, electric vehicles (not shown) use the moveable secondary 116 to receive power coupled thereto from the primary conductor to charge an on-board energy storage system. The electric vehicles typically operate on a track system (not shown) that includes at least one portion having the primary conductor 102 extending for a predetermined distance. As the electric vehicle moving along the track system enters the predetermined portion that includes the primary conductor the moveable secondary 116 will magnetically coupled to the primary conductor 102 as described above transferring power to the moveable secondary 116. This allows the electric vehicle to receive electrical power to charge the on-board energy storage device when the vehicle is traversing the predetermined portion.

The air gap 124 is sufficiently large to permit free longitudinal travel of the toroidal core 118 but thin enough to ensure strong magnetic coupling between the center conductor 102 and the toroidal core 118. Because the toroidal core 118 has a thickness that is many times smaller than the length of the center conductor, only a small percentage of the magnetic flux generated by the entire length of the center conductor 102 is coupled to the toroidal core 118 and the multi-turn coil 120. This results in a small coupling coefficient between the center conductor 102 and the toroidal core 118. The voltage induced in the plurality of coils 120 is proportional to the product of the rate of change of the current flowing in the center conductor 102 and the magnetic coupling between the center conductor 102 and the toroidal core 118. In general, the current in the center conductor 102 is an alternating current in which the magnitude of the current pulses should be as large as possible and the frequency of the switching current pulses should be as high as practical.

As discussed above, the plurality of coils 120 are placed radially about the toroidal core 118 opposite of the air gap 124. In this configuration, each of the coils will link substantially the same amount of magnetic flux generated by the center conductor 102. If the radial dimension of the air gap 124 is no greater than the radial dimension of air gap 122 the mutual inductance between the center conductor 102 and the multi-turn coil 120 is approximately $\mu_0 NA/g$, where $\mu_0$ is the permeability of free space, N is the number of turns in the multi-turn coil 120, A is the cross sectional area of the toroidal core 118, and g is the dimension of the air gap 122.

Figure 2:
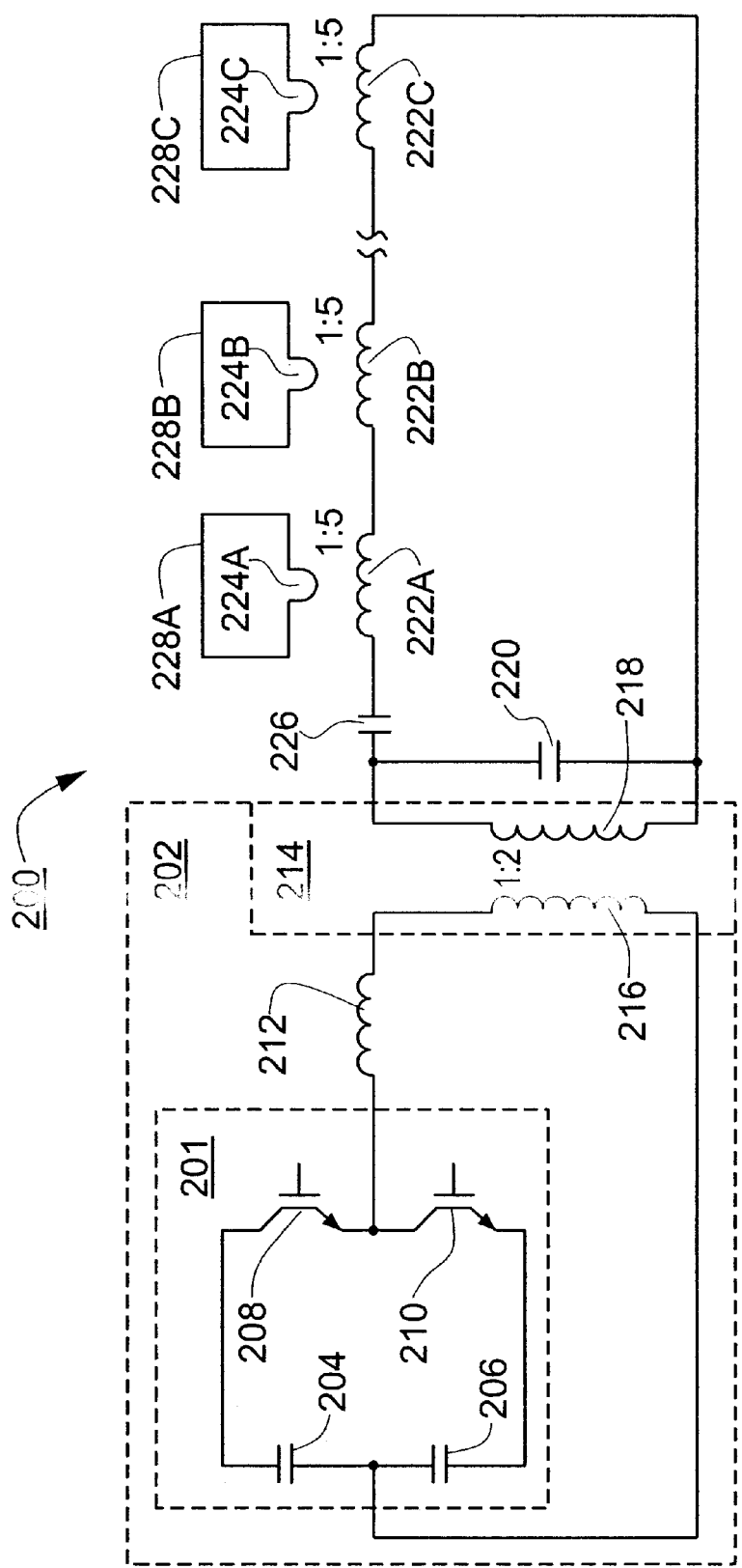
FIG. 2 is a schematic diagram of a power distribution system suitable for use with the coaxial transformer depicted in FIG. 1.

FIG. 2 depicts one embodiment of a power distribution system 200 that includes the primary center conductor. In particular, FIG. 2 depicts a distribution circuit 200 that includes an inductive power source 202 that provides a plurality of voltage pulses having a predetermined frequency and magnitude. The inductive power source includes a voltage source 201 providing a switched output signal having a predetermined voltage and current at a first predetermined frequency. The voltage source 201 includes first and second power bus capacitors 204 and 206 that are coupled to first and second insulated gate bipolar junction transistors (IGBJT), 208 and 210 respectively, that are configured as a half-bridge to provide current regulation to the power bus capacitors 204 and 206. The first and second IGBJTs 208 and 210 are further configured to provide the voltage at a predetermined frequency. A three-phase power input (not shown) charges the first and second bus capacitors to 140 volts.

The switched output signal of the voltage source 201, i.e., the output from the first and second IGBJTs, 208 and 210 respectively, is provided to an inductor 212 that is connected in series therewith. The inductor 212 primarily passes the sine wave component of the switched output signal of the voltage source 201, and sets the current of the switched output signal as well. A transformer 214 having a primary winding 216 connected between the inductor 212 and the common junction of the first and second power bus capacitors 204 and 206. Preferably, the predetermined frequency is 20 KHz, the first and second bus capacitors 204, 206 are charged to 140 volts, and the inductor 212 is selected to provide 10 amps of current at the predetermined frequency. Preferably, the inductor has a value of 110 $\mu$H. Thus, in a preferred embodiment a switched output signal having a voltage of 140 volts, a current of 10 amps, and a switching frequency of 20 KHz is applied to the primary winding 216 of transformer 214.

The secondary winding 218 of the transformer 214 is connected in parallel to a capacitor 220 and in series with a plurality of transformer primary windings 222A, 222B, and 222C. Each transformer primary winding 222A, 222B, and 222C are coupled to a corresponding one of a plurality of transformer secondary windings 224A, 224B, and 224C respectively. The capacitor 220 is selected to tune the inductance of each of the plurality of transformer primary windings 222A–222C and the inductance of the cable connecting the primary windings to the predetermined frequency. In a preferred embodiment, the secondary winding 218 and the primary winding 216 of transformer 214 have a turns ratio of 2:1 so that a signal having a voltage of 70 volts, 20 Amps, and a frequency of 20 KHz is induced in the secondary winding 218.

It is preferable that there be little or no voltage drop across each primary winding 222A–222C other than the small DC voltage drop across the resistance that is inherent in the each winding. To achieve this, a tuning capacitor 226 is added in series with the plurality of transformer primary windings 222A–22C. The tuning capacitor has a value selected such that the capacitive reactance of the tuning capacitor 226 at the predetermined frequency will cancel the inductive reactance of all of the plurality of transformer primary windings 222A–222C and the inductance of the cable connecting the primary windings at the frequency of interest. Alternatively, each primary winding 222A–22C can include a tuning capacitor in series therewith that is selected to cancel the inductive reactance of the corresponding transformer primary winding. Accordingly, in the preferred embodiment in which a signal having a voltage of nearly 70 volts, a current of 20 amps, and a frequency of 20 KHz will be provided to each of the plurality of transformer windings 222A–222C.

Each of the plurality of transformer primary windings 222A–222C and the corresponding one of the plurality of transformer secondary windings 224A–224C have a turns ratio that is selected to provide a desired current and voltage to the respective center conductor 224A–224C. Preferably, the primary to secondary turns ratio is 5:1. Accordingly, for an input signal having a voltage of 70 volts, a current of 20 amps, and a frequency of 20 KHz, each of the secondary windings 224A–224C will provide a signal to the corresponding center conductors 224A–224C having a voltage of 14 volts, a current of 100 amps, and a frequency of 20 KHz. In addition, more than one toroidal core can be used with each secondary, and in one embodiment, a plurality of toroidal cores each having a secondary winding consisting of a plurality of coils disposed upon is used.

In one embodiment, the respective center conductors 228A–228C are oriented and positioned such that as an electric vehicle moves from one destination to another on a track or monorail system (not shown) the secondary of the electric vehicle engages the primary center conductor within the central orifice of the toroidal core and receives energy therefrom. The center conductors can be spaced apart to recharge an on-board energy source at an appropriate rate, or can be sequentially arranged abutting against adjacent center conductors to maintain a nearly constant energy flow to the electric vehicle. Such a system can be employed in a semiconductor fabrication plant as a semiconductor wafer transportation system for transporting semiconductor wafers between successive work stations.

When used as a semiconductor transportation system there may be one or more material transport vehicles that are moveable along one or more track sections for movement between the work stations. Each of the material transport vehicles includes an associated moveable secondary, an associated energy storage device such as a battery or an ultracapacitor and an associated power supply for charging the energy storage device and operating other electronic systems contained on the material transport vehicle. Power coupled to the moveable secondary is provided to the power supply on-board the associated material transport vehicle and converted and processed thereby so as to be suitable for charging the on-board energy storage device and operating the associated electronic systems.

Those of ordinary skill in the art should further appreciate that variations to and modification of the above-described apparatus and system for providing inductive power and distribution using coaxial transformers may be made without departing from the inventive concepts disclosed herein. Accordingly, the invention should be viewed as limited solely by the scope and spirit of the appended claims.

What is claimed is:

1. An inductive power transfer apparatus for transferring power from a power source comprising:
   a primary conductor having a longitudinal axis, the primary conductor extending in the longitudinal direction, the primary conductor having a first end and a second end;
   a return conductor surrounding the primary conductor and spaced apart therefrom;
   a first support element configured and arranged to secure the center conductor in place;
   the primary conductor electrically coupled to the power source and receiving power therefrom and the primary conductor further electrically coupled to the return conductor, the return conductor being electrically coupled to the power source to provide a return path thereto;
   a moveable secondary winding including a high permeability toroidal core coaxially disposed about the center conductor and spaced apart therefrom forming a first air gap, the toroidal core including a second air gap, the first support element disposed within the second air gap, the secondary winding further including a multi-turn coil disposed radially about a portion of the high permeability toroidal core;
   a second support element configured and arranged to support the high permeability core and the multi-turn coil; and
   whereby an alternating current imposed upon the primary conductor by the power source generates a magnetic field that is magnetically coupled to the multi-turn coil and induces a voltage therein.

2. The inductive power transfer apparatus of claim 1, wherein the first support element is coupled to the primary conductor and connected to the inner surface of the return conductor.

3. The inductive power transfer apparatus of claim 1, wherein the second support element includes a first support section coaxially disposed about the high permeability core and the multi-turn coil, the support member further including a flange end and a connecting element connecting the first support section and the flange end, the connecting element disposed within the second air gap and extending beyond the exterior surface, wherein the flange end is spaced apart from the exterior surface.

4. The inductive power transfer apparatus of claim 1 wherein the return conductor is composed of aluminum.

5. The inductive power transfer apparatus of claim 1 wherein the first support element is composed of aluminum, the first support element being electrically insulated from the outer conductor.

6. The inductive power transfer apparatus of claim 1 wherein the high permeability toroidal core is composed of ferrite.

7. The inductive power transfer apparatus of claim 1 wherein the high permeability toroidal core is C-shaped.

8. The inductive power transfer apparatus of claim 1 wherein the second support member is composed of aluminum.

9. The inductive power transfer apparatus of claim 1 wherein the center conductor is a Litz wire.

10. The inductive power transfer apparatus of claim 1 wherein the primary conductor is electrically coupled to the power source and receives power therefrom via a shielded coaxial conductor.

11. The inductive power transfer apparatus of claim 1 wherein the primary conductor is electrically coupled to the return conductor via a conductor having a large surface area and a thin cross sectional area.

* * * * *

UNITED STATES PATENT AND TRADEMARK OFFICE
CERTIFICATE OF CORRECTION

PATENT NO. : 6,686,823 B2
DATED : February 3, 2004
INVENTOR(S) : Floyd D. Arntz et al.

It is certified that error appears in the above-identified patent and that said Letters Patent is hereby corrected as shown below:

Column 4,
Line 51, "thee" should read -- the --;

Column 6,
Line 47, "222A-22C." should read -- 222A-222C. --;
Line 53, "222A-22C" should read -- 222A-222C --;
Line 64, "224A-224C." should read -- 228A-228C. --; and Column 7,
Line 2, "224A-224C" should read -- 228A-228C --.

Signed and Sealed this

Twenty-third Day of November, 2004

JON W. DUDAS
*Director of the United States Patent and Trademark Office*